(12) United States Patent
Hicks, III et al.

(10) Patent No.: US 9,021,365 B2
(45) Date of Patent: Apr. 28, 2015

(54) APPARATUS AND METHOD FOR DISTRIBUTING MEDIA CONTENT

(75) Inventors: John Alson Hicks, III, Roswell, GA (US); Randy Zimler, Gainesville, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1265 days.

(21) Appl. No.: 12/463,793

(22) Filed: May 11, 2009

(65) Prior Publication Data

US 2010/0287480 A1 Nov. 11, 2010

(51) Int. Cl.
| | |
|---|---|
| G06F 3/00 | (2006.01) |
| H04L 29/08 | (2006.01) |
| H04L 12/28 | (2006.01) |
| H04L 29/06 | (2006.01) |

(52) U.S. Cl.
CPC ........ *H04L 67/2823* (2013.01); *H04L 12/2809* (2013.01); *H04L 12/2827* (2013.01); *H04L 2012/2843* (2013.01); *H04L 65/4084* (2013.01); *H04L 67/36* (2013.01); *H04L 67/02* (2013.01)

(58) Field of Classification Search
CPC ............... H04L 67/02; H04L 67/36
USPC ................................. 715/748, 749
See application file for complete search history.

(56) References Cited

U.S. PATENT DOCUMENTS

| | | | | |
|---|---|---|---|---|
| 5,745,539 | A * | 4/1998 | Lang .............................. | 376/259 |
| 6,026,459 | A * | 2/2000 | Huppenthal ................... | 710/116 |
| 8,141,115 | B2 * | 3/2012 | Wohlert et al. ................. | 725/48 |
| 2002/0019888 | A1 * | 2/2002 | Standridge et al. ........... | 709/328 |
| 2004/0006484 | A1 * | 1/2004 | Manis et al. ................... | 704/500 |
| 2004/0036478 | A1 * | 2/2004 | Logvinov et al. .............. | 324/534 |
| 2005/0289266 | A1 * | 12/2005 | Illowsky et al. ............... | 710/104 |
| 2007/0124737 | A1 * | 5/2007 | Wensley et al. ................ | 719/314 |
| 2007/0186180 | A1 * | 8/2007 | Morgan ......................... | 715/779 |
| 2008/0170540 | A1 * | 7/2008 | Fukuda .......................... | 370/328 |
| 2008/0281718 | A1 * | 11/2008 | Morgan .......................... | 705/26 |
| 2008/0320543 | A1 * | 12/2008 | Wang et al. .................... | 725/131 |
| 2010/0008370 | A1 * | 1/2010 | Li et al. .......................... | 370/401 |
| 2011/0051721 | A1 * | 3/2011 | Brothwell et al. ............. | 370/353 |
| 2013/0006560 | A1 * | 1/2013 | Cern ............................... | 702/66 |

FOREIGN PATENT DOCUMENTS

JP 2009042905 A * 2/2009

OTHER PUBLICATIONS

CEA-2014 Web-based Protocol and Framework for Remote User Interface on UPnP Networks and the Internet(Web4CE), Global Engineering Documents, Jun. 2, 2006.

* cited by examiner

*Primary Examiner* — William Bashore
*Assistant Examiner* — Gregory A Distefano
(74) *Attorney, Agent, or Firm* — Guntin & Gust, PLC; Jay H. Anderson

(57) ABSTRACT

A system that incorporates teachings of the present disclosure may include, for example, a server having a controller to determine a common user interface to be presented by a group of media devices of a premises where the group of media devices are capable of receiving media content from the server over a power line of the premises and are capable of presenting the media content, detect user interaction with the common user interface from different media devices of the group of media devices, and transmit display signals to the group of media devices for displaying the user interaction on the common user interface, where the display signals differentiate the different media devices that received the user interaction. Other embodiments are disclosed.

25 Claims, 8 Drawing Sheets

500

APPARATUS AND METHOD FOR DISTRIBUTING MEDIA CONTENT

FIELD OF THE DISCLOSURE

The present disclosure relates generally to communication systems and more specifically to an apparatus and method for distributing media content.

BACKGROUND

Residences and businesses can utilize various types of media devices for presenting media content. These devices often have the ability to share or otherwise present the same media content that is retrieved from a source.

DETAILED DESCRIPTION

Figure 1:
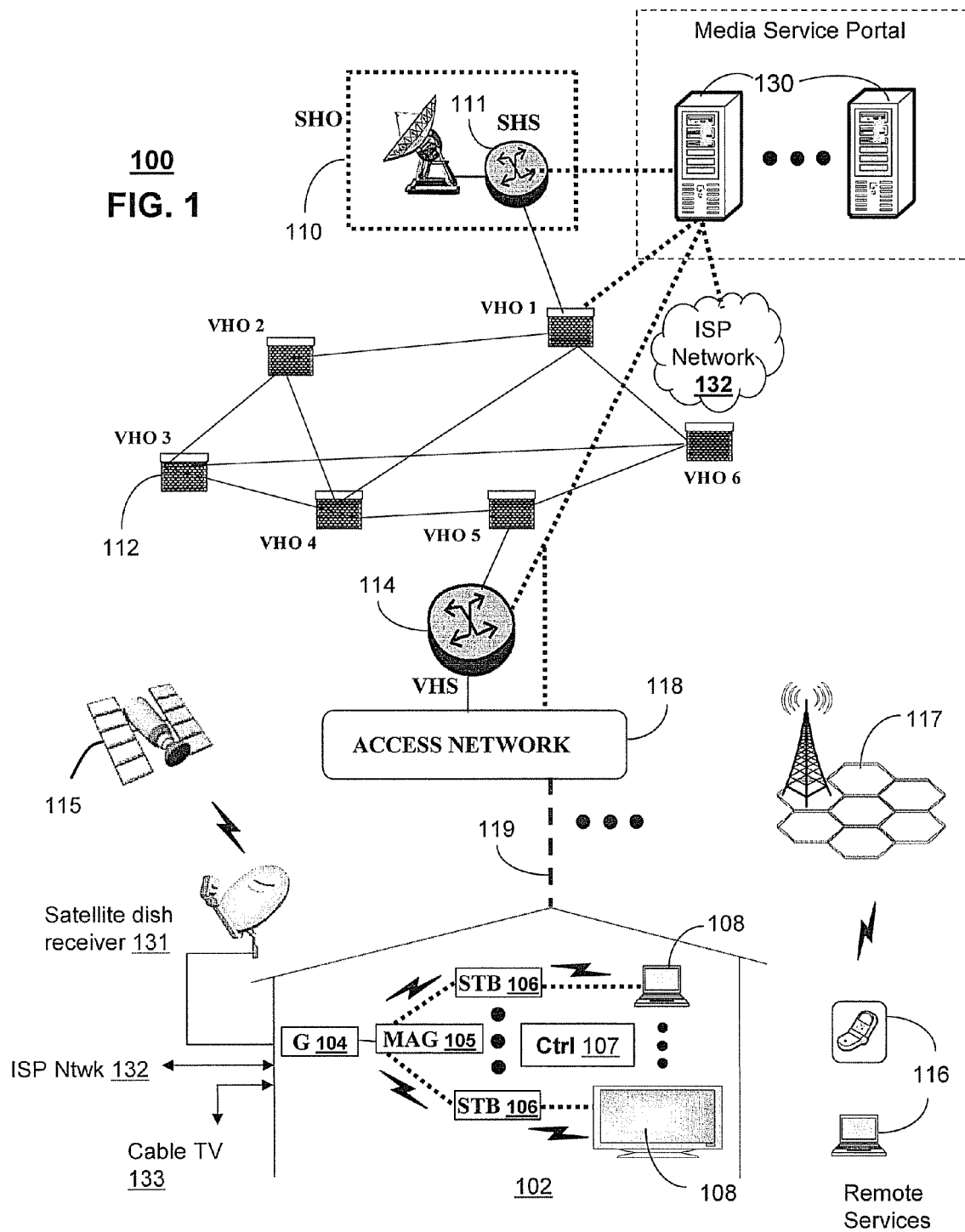
FIG. 1 depicts an illustrative embodiment of a communication system that provides media services.

One embodiment of the present disclosure can entail computer-readable storage medium comprising computer instructions to detect a group of media devices of a premises that are capable of presenting media content and are compatible with a media gateway for receiving the media content from the media gateway over a power line of the premises, determine a common user interface to be presented by the group of media devices, detect first user interaction with the common user interface from a first media device of the group of media devices, transmit first display signals to the group of media devices for displaying the first user interaction on the common user interface using a first icon that is visually representative of the first media device, detect second user interaction with the common user interface from a second media device of the group of media devices, and transmit second display signals to the group of media devices for displaying the second user interaction on the common user interface using a second icon that is visually representative of the second media device.

Another embodiment of the present disclosure can entail a server having a controller to determine a common user interface to be presented by a group of media devices of a premises where the group of media devices are capable of receiving media content from the server over a power line of the premises and are capable of presenting the media content, detect user interaction with the common user interface from different media devices of the group of media devices, and transmit display signals to the group of media devices for displaying the user interaction on the common user interface where the display signals differentiate the different media devices that received the user interaction.

Yet another embodiment of the present disclosure can entail a media device having a controller to present a common user interface where the media device is one of a group of media devices of a premises that presents the common user interface and where the group of media devices are capable of receiving media content from a media gateway and are capable of presenting the media content, detect user interaction with the common user interface, transmit interaction signals representative of the detected user interaction to the media gateway, and receive display signals from the media gateway where the display signals comprise the user interaction and where the display signals differentiate different media devices of the group of media devices that received user interaction.

Yet another embodiment of the present disclosure can entail a server having a controller to detect a group of media devices of a premises that are capable of receiving media content from the server over a power line of the premises and are capable of presenting the media content, receive media content in a plurality of formats from one or more media sources, adjust the plurality of format into a common format presentable by each of the group of media devices, and transmit display signals to each of the group of media devices for displaying a common user interface.

Yet another embodiment of the present disclosure can entail a method including determining a common user interface to be presented by a group of media devices of a premises where the group of media devices are capable of receiving media content from a media gateway and are capable of presenting the media content, detecting user interaction with the common user interface from different media devices of the group of media devices, and transmitting display signals to the group of media devices for displaying the user interaction on the common user interface, where the display signals differentiate the different media devices that received the user interaction.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be involved between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the computing devices 130 can comprise a network of servers having access to media content and the ability to wirelessly provide that media content to a Multimedia Application Gateway (MAG) 105. The servers 130 can be part of a service provider and/or can be third party providers. In one embodiment, the servers 130 can receive media content requests and retrieve the media content from other sources, such as through internet searches, service agreements and the like. In one embodiment, the servers 130 can provide for converting media formats so as to be appropriate for the receiving device associated with the MAG 105. The particular communication protocol and technique can vary and can include WiFi, WiMax, Bluetooth, and so forth. In one embodiment, the servers 130 can be multimode devices that determine and/or utilize a desired or preferred mode of communication for the download.

The MAG 105 can include a Digital Living Network Alliance (DLNA) media server application, a remote User Interface application, a memory storage device such as an internal hard drive, Power Line Communication (PLC) capability and/or wireless communication capability. For instance, the MAG 105 can be used in conjunction with DLNA protocols to provide access to a Media & Entertainment Portal Service for retrieving media content. A remote UI Application on the MAG 105 can provide the UI on a media device to the M&E Portal Service via a DLNA TV and/or a DLNA Media Player. In one embodiment, the DLNA Media Player can be connected to a video input on the TV (such as HDMI, Component Video or S-Video). The connection between the DLNA Media Server Application on the MAG 105 and the DLNA TVs/DLNA Media Players can be established using HomePlug AV/Ethernet adapters (or other PLC devices) and/or Wi-Fi (or other wireless techniques). In one embodiment, the media content can be ordered from any MAG compatible device within the home or other local area network, and can be downloaded and stored on the MAG, then it can be streamed over the network and viewed on any DLNA capable device. While system 100 is described with respect to DLNA compatible devices, it should be understood that other standards or protocols can be implemented and followed by the components described above that allow for communication between premises media devices.

In one embodiment, a Digital Media Server and a Digital Media Player can be utilized. The Digital Media Server application can run on or otherwise be implemented by the MAG 105, while the Digital Media Player application can run on or otherwise be implemented by the media device 108. For instance, Consumer Electronics Association (CEA) 2014 Remote User Interface (RUI) software can run on the MAG 105 and can render the User Interface that is rendered by the Digital Media Player on the display device, e.g., TV or PC. This can be a client server paradigm. A DLNA TV can have an integrated Digital Media Player. DLNA Media Extenders can be used with non-DLNA TVs. The system 100 can utilize various user interface protocols which can include CEA-2014 RUIS (RUI Server) and CEA-2014 RUIC (RUI Client).

In another embodiment, a DLNA Gateway function can be performed by the MAG 105 wherein proprietary protocols can be converted to DLNA protocols. A DLNA Gateway can be used to convert different forms of video content, e.g., CATV, Satellite, Off-the-Air and Internet, coming into the service provider into a standard DLNA format when it leaves the service provider Gateway. This is a protocol conversion function. In one embodiment, this can include removing a proprietary DRM and replacing it with DTCP-IP which is a link level protection protocol. The output from the service provider Gateway that is streamed over the home network to DLNA TVs, DLNA Media Extenders connected to TVs, PCs equipped with a DLNA Digital Media Player (including software) and/or mobile devices equipped with a DLNA Media Player (including software) can be compatible with DLNA protocol. The MAG 105 can convert streaming video input into DLNA protocols and pass the streaming video on to a device equipped with a DLNA Media Player. In addition, the MAG 105 can be equipped with a hard drive and stream content off of the hard drive to a device equipped with a DLNA Media Player.

System 100 through use of MAG 105 provides for DLNA protocol conversion. It provides users access to a variety of different types of video content on their DLNA TV or TV equipped with a DLNA Media Extender. Within an integrated user interface on the TV, system 100 can provide a user access to video content from a variety of sources, such as CATV, Satellite, Off-the-Air, IPTV and the Internet. For example, a customer can be using a DBS service from a service provider, such as through a service agreement between providers, and then IPTV may become available in their neighborhood. The customer may desire to subscribe to the IPTV, but they do not want to give up the offerings from the DBS service. Using system 100 through converting both services into a DLNA protocol leaving the service provider Gateway, therefore, the customer can simultaneously be a subscriber to both services. In one embodiment, MAG 105 can provide for local execution of applications, such as: HD Video Conferencing, Home Security and Home Automation & Control.

It follows from the above illustrations that the present disclosure can apply to any present or future interactive media content services.

Figure 2:
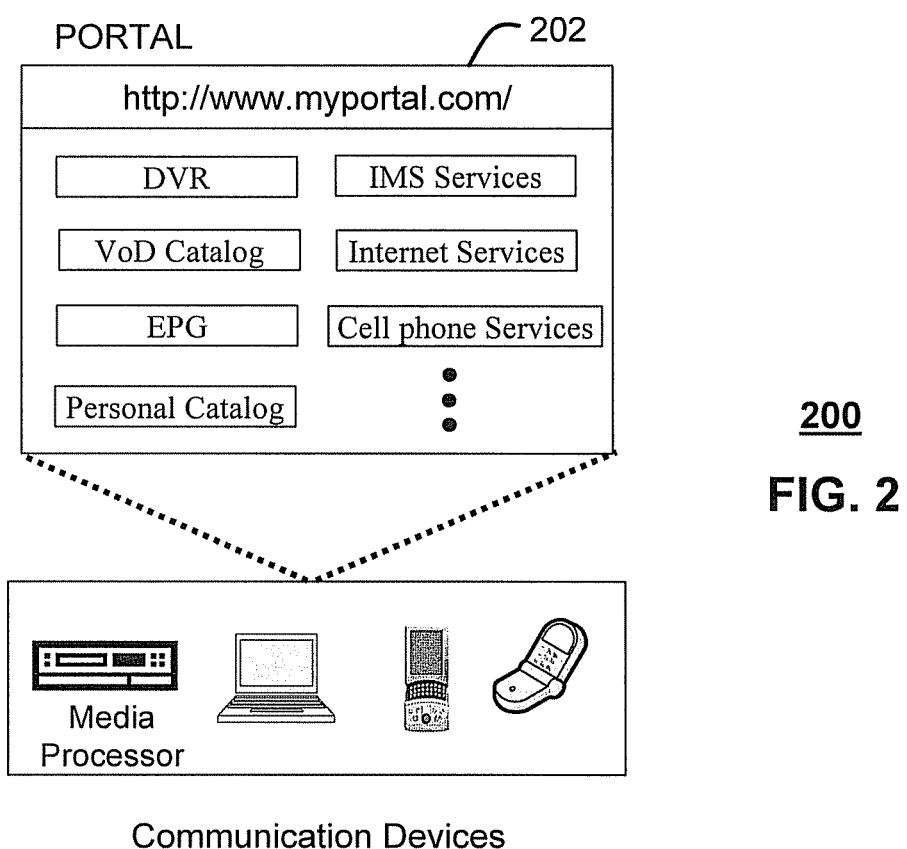
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
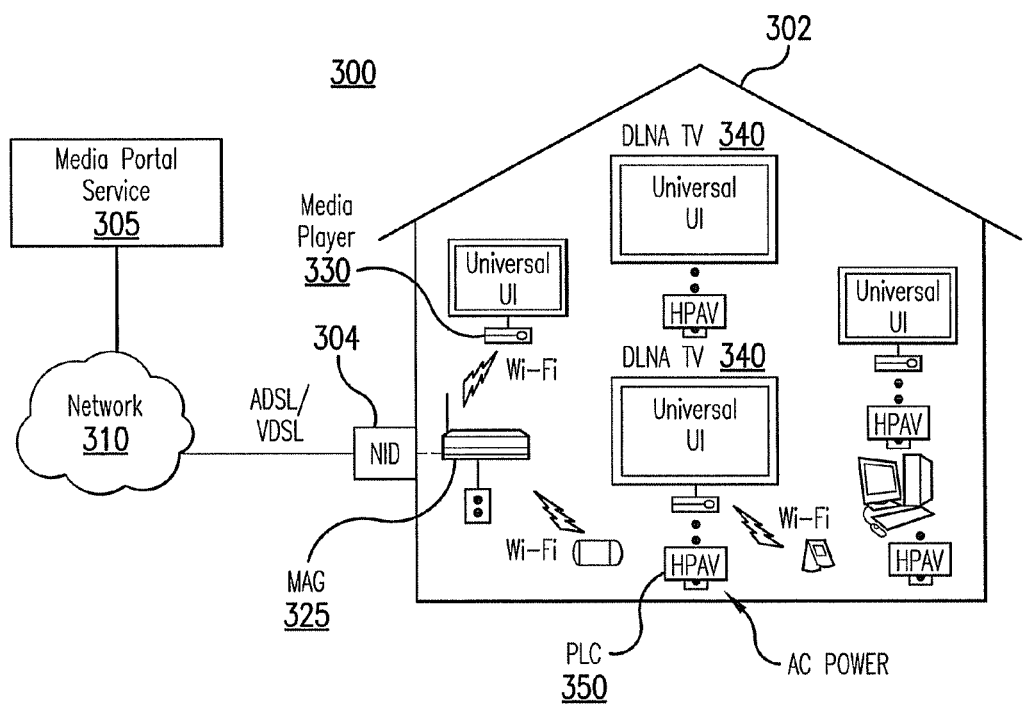
FIG. 3 depicts an illustrative embodiment of a communication system that provides media services.

FIG. 3 depicts an exemplary embodiment of a communication system 300 for delivering media content. Communication system 300 can be overlaid or operably coupled with communication system 100 as another representative embodiment of said communication systems.

System 300 can include a user network, residence or other premises location 302 having a gateway or NID 304 that is in communication with a network 310 for retrieving media content from a media service portal 305. System 300 can utilize various protocols, techniques and combinations thereof for transmitting the requested media content to the gateway 304 and MAG 325, including WiFi, WiMax, GPRS, 3G, 4G and so forth. System 300 can also utilize various protocols, techniques and combinations thereof for transmitting the requested media content to various points throughout the system, including use of an IPTV access network, the public Internet, and/or an IMS network.

MAG 325 can be in communication with a plurality of media devices distributed throughout the residence 302, such as media players 330 and TVs 340. The particular type of media device can vary and can include PCs, laptops, PDAs, mobile phones and any other device capable of receiving and presenting media content from the MAG 325. In one embodiment, each of the media devices is compatible with each other, such as being DLNA compatible. The MAG 325 can communicate with the various media devices through wireless communication (such as WiFi) and through PLC, such as through use of HomePlug AV devices that only require the media device to be plugged into the power line of the premises. The particular mode of communication (PLC or wireless) can be determined by the MAG 325 or some other component based on a number of factors, such as based on monitoring of communication efficiency.

The MAG 325 and/or the media service portal 305 can have access to a database, which can be used for establishing and maintaining user profiles or other user information. The user profiles can be associated with one or more users of the network, as well as their communication devices. The user profiles can include device identification data, device and/or user preferences, format capabilities, service plans, presence information, and so forth. In another embodiment, the user profiles can include monitored behavior and history of the user and/or user pre-selections, such as preferences inputted by the user in temporal proximity to a request for downloading media content to the MAG 325. In another embodiment, the user information or profiles can be imported in whole or in part from other sources, such as from a third party network, including previous service providers.

In one embodiment, the MAG 325 can provide for signal processing to be applied to the video content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference.

For example, the media content video data can be reformatted using E-VSB or other multi-profiling formats with main and lower profile versions. The lower profile versions of the video stream can have a lower resolution but higher error correction data (such as Forward Error Correction data) in order to maintain a link with devices receiving a weak signal. The particular error correction technique utilized for the various profiles can vary and can include FEC, such as block coding, convolution coding, concatenate coding, turbo coding and so forth.

Figure 4:
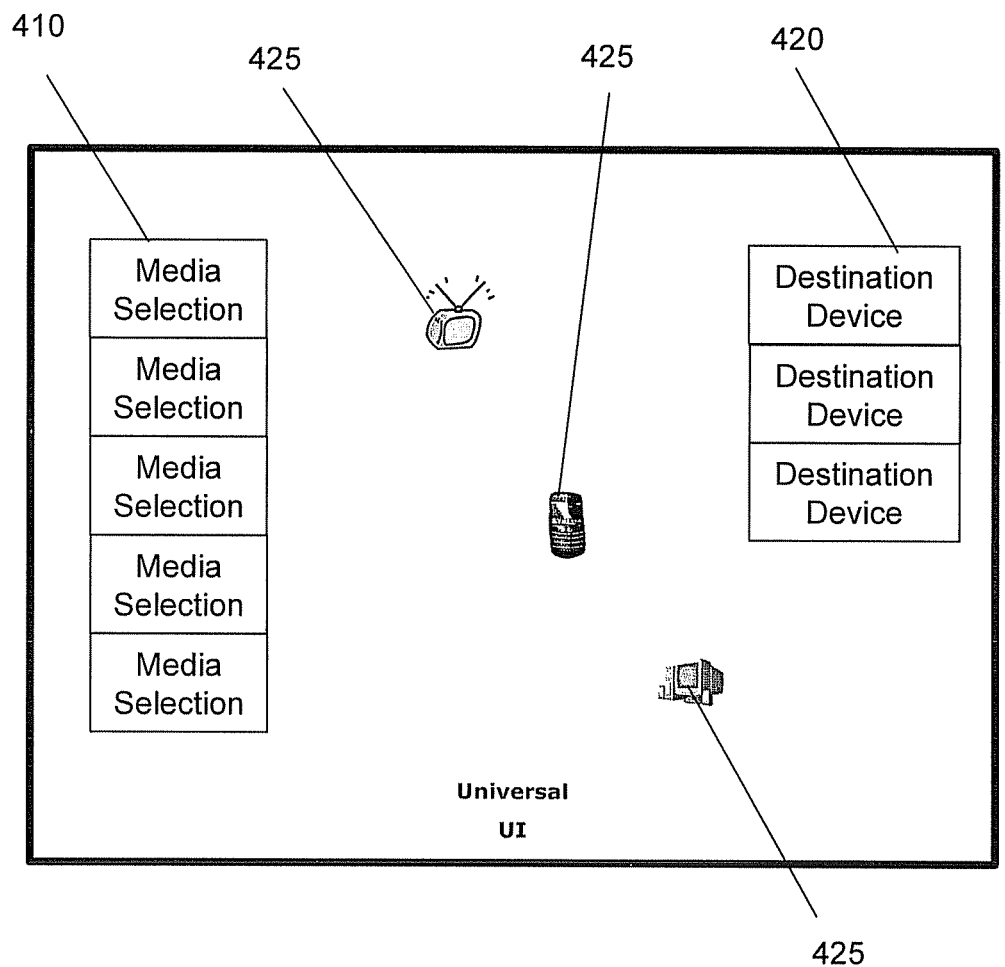
FIG. 4 depicts an illustrative embodiment of a user interface that can be utilized by each of the media devices of FIGS. 1 and 3.

FIG. 4 depicts an illustrative example of a graphical user interface 400 that can be utilized by MAG 325 for presentation on each of the media devices. In one embodiment, GUI 400 can be a universal or common user interface that all of the devices present so as to provide a continuity of control for the user regardless of the particular media device that is being utilized to implement the system control. GUI 400 can include various buttons or toolbars 410 for selecting desired media content. Toolbars 410 can represent the particular media content and/or can be tools for searching for desired media content. In one embodiment, toolbars 410 can represent media content that is selected by MAG 325 based on monitored behavior of one or more users of the home network. GUI 400 can also include buttons or toolbars 420 that represent media device that are to receive selected media content. For instance, a user can manipulate GUI 400 that is being presented on a TV in the premises network in order to have media content delivered to the TV or to other devices, such as a mobile device. In one embodiment, the user can select multiple devices for receipt of the media content.

GUI 400 can provide for inputting of user interactions simultaneously by multiple media devices. For instance, a user of the TV can be selecting a first media content while a user of the mobile device can be selecting a second media content. GUI 400 can display the user interaction of both users, such as through a plurality of cursors or other user indicators 425. In one embodiment, each of the cursors 425 can visually indicate the media device to which it corresponds, such as a first cursor being in the shape of a TV and representing user interaction through the TV, a second cursor being in the shape of a mobile phone and representing user interaction through the mobile phone, and a third cursor being in the shape of a PC and representing user interaction through the PC.

The GUI 400 can show the manipulations being performed by each of the different users so that each of the users can see what they are doing as well as what the other users are doing. In one embodiment, a priority of control can be determined for the different media devices to prevent inconsistent user manipulations. For instance, user interaction performed at the TV can take precedent over user interaction performed at the mobile device so that if the user of the TV indicates a particular recipient device for selected media content then the user of the mobile device cannot contradict or otherwise change that user interaction.

Figure 5:
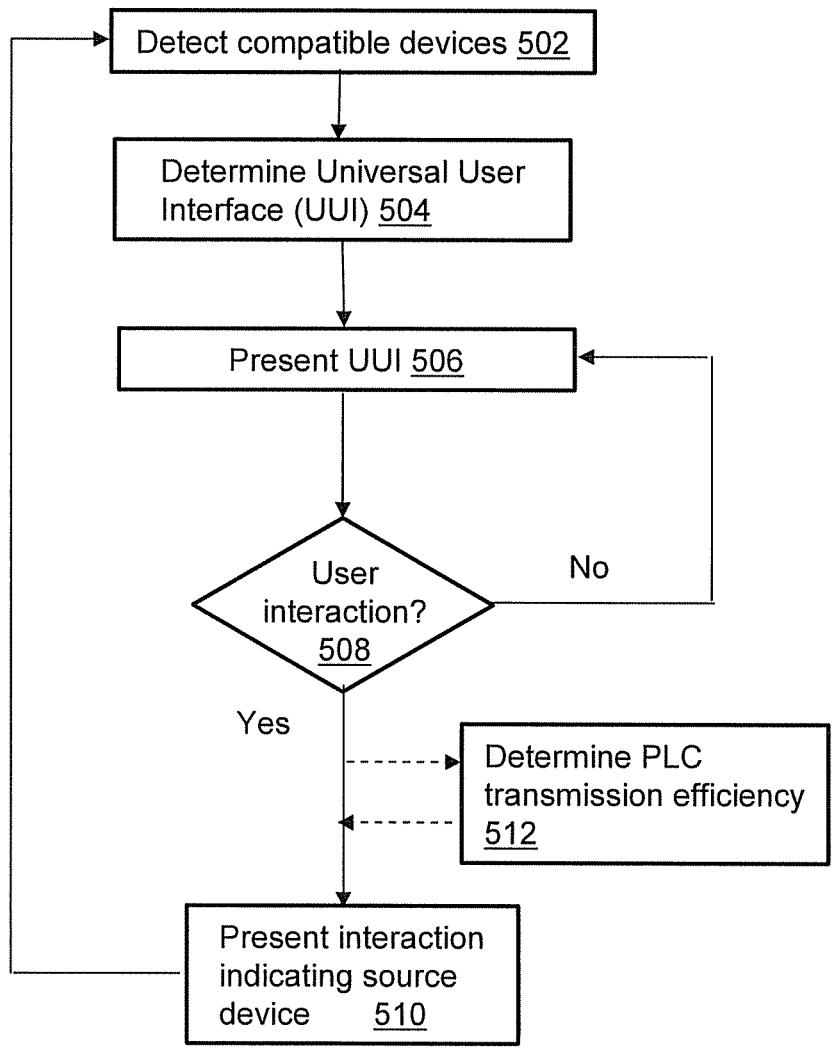
FIG. 5 depicts an illustrative embodiment of a method operating in portions of the communication systems of FIGS. 1 and 3.

FIG. 5 depicts an illustrative method 500 operating in portions of communication systems 100 and 300. Method 500 can begin with step 502 in which the MAG 325 can detect compatible media devices. The compatible media devices can be capable of communicating with the MAG 325 for receipt of and presentation of media content. In one embodiment, the compatibility allows the MAG 325 to store a single format of the media content and transmit the media content to any one of the media devices for presentation. In another embodiment, each of the media devices can be DLNA compliant. In yet another embodiment, one or more of the media devices, as well as the MAG 325 can be capable of communicating via PLC and communicating via wireless communication link. For example, upon being powered up, the media device can send a wireless signal that can be detected by the MAG 325 so that the MAG recognizes the particular media device as being one of a group of compatible media devices in the premises.

In step 504, the MAG 325 can determine a universal or common user interface that is to be utilized by the group of media devices. The determination can be based on user input from one or more of the media devices. For instance, a user can utilize the GUI presented on a TV to communicate with the MAG 325 and designate the particular common user interface that is to be utilized. The common user interface can be the GUI used by any one of the media devices and can also be a distinct GUI. In one embodiment, the MAG 325 can designate the common user interface. For instance, a service provider may have a template for a common user interface that is to be used throughout a network of premises. In another embodiment, the common user interface can be customized based upon input from one or more of the media devices, such as rearranging the positioning of buttons or tool bars based on user preferences that provided by the user via one or more of the media devices. The user preferences can also be retrieved from a user profile associated with the premises or one or more of the media devices.

In step 506, the common user interface can be presented by the group of media devices. For example, the MAG 325 can transmit display signals to the media devices so that each of the media devices is capable of presenting the same common user interface at the same time. The display signals can be transmitted via the power line of the premises and/or wirelessly from the MAG 325 to each of the media devices. The mode of transmission can be based on a number of factors, including parameters associated with the power line.

In step 508, user interaction can be detected. For instance, a user can manipulate his or her remote controller to make a selection of media content based on the display of the common user interface on the TV. The manipulation can include actuation of an icon or cursor associated with the common user interface. Actuation signals can be transmitted from the media device receiving the user interaction to the MAG 325. In step 510, display signals can then be sent from the MAG 325 to each of the media devices so that the media devices can display the user interaction in combination with the user interaction. The MAG 325 can differentiate the user interaction based on the media device receiving the user interaction. For example, user interaction occurring at the TV can be displayed through movement of a cursor or icon that resembles a TV. The common user interface can utilize multiple icons to represent each of the media devices. In one embodiment, the common user interface can display an icon for each of the detected media devices. The common user interface can simultaneously receive and display user interaction.

In one embodiment, prioritization of user interaction can be done in order to address contradictory user interaction. For instance, a priority can be assigned based on a type of device and the priority can be utilized to resolve contradictory control being implemented by different user interaction, such as a selection of different media content to be transmitted to the same media device.

In one embodiment in step 512, the PLC transmission efficiency or effectiveness can be evaluated in order to determine a mode of communication. For instance, parameters associated with the power line can be obtained and a selection of communicating over one of the power line and a wireless communication link can be made based on the parameters. In one embodiment, the parameters can be retrieved by and evaluated by the MAG 325, although other components can be utilized to perform these steps. The parameters can be of various types that would effect the transmission of data over the power line. For instance, noise due to a large amount of current passing through the power line can be evaluated in order to determine whether to communicate via the power line or communicate wirelessly. In one embodiment, various control signals associated with the common user interface and/or the media content can be transmitted wirelessly while the media content is transmitted via the power line communication.

The media content being downloaded in method 500 can vary and can include data files, e-mails, video games, and so forth. In one embodiment, DRM policies can be applied to the retrieval of the media content. For instance, downloading can be limited to particular media devices. In one embodiment, the user profiles can include monitored behavior data associated with the user and one or more of the user's communication devices. The behavior data can be utilized in determining format adjustments for the media content to be delivered to the media devices.

Upon reviewing the aforementioned embodiments, it would be evident to an artisan with ordinary skill in the art that said embodiments can be modified, reduced, or enhanced without departing from the scope and spirit of the claims described below. For example, the MAG 325 can allow for partial delivery to media devices. For instance, a first portion of the media content can be downloaded to the TV while a second portion of the media content is being downloaded to a mobile device (such as a hand-held TV device). In another embodiment, the mode of communication can be adjusted based on the power line parameters. For instance, the MAG 325 can commence delivering the media content over the power line to one or more of the media devices and then can switch to delivery via a wireless communication link and when undesired parameters of the power line are detected.

Other suitable modifications can be applied to the present disclosure without departing from the scope of the claims below. Accordingly, the reader is directed to the claims section for a fuller understanding of the breadth and scope of the present disclosure.

Figure 6:
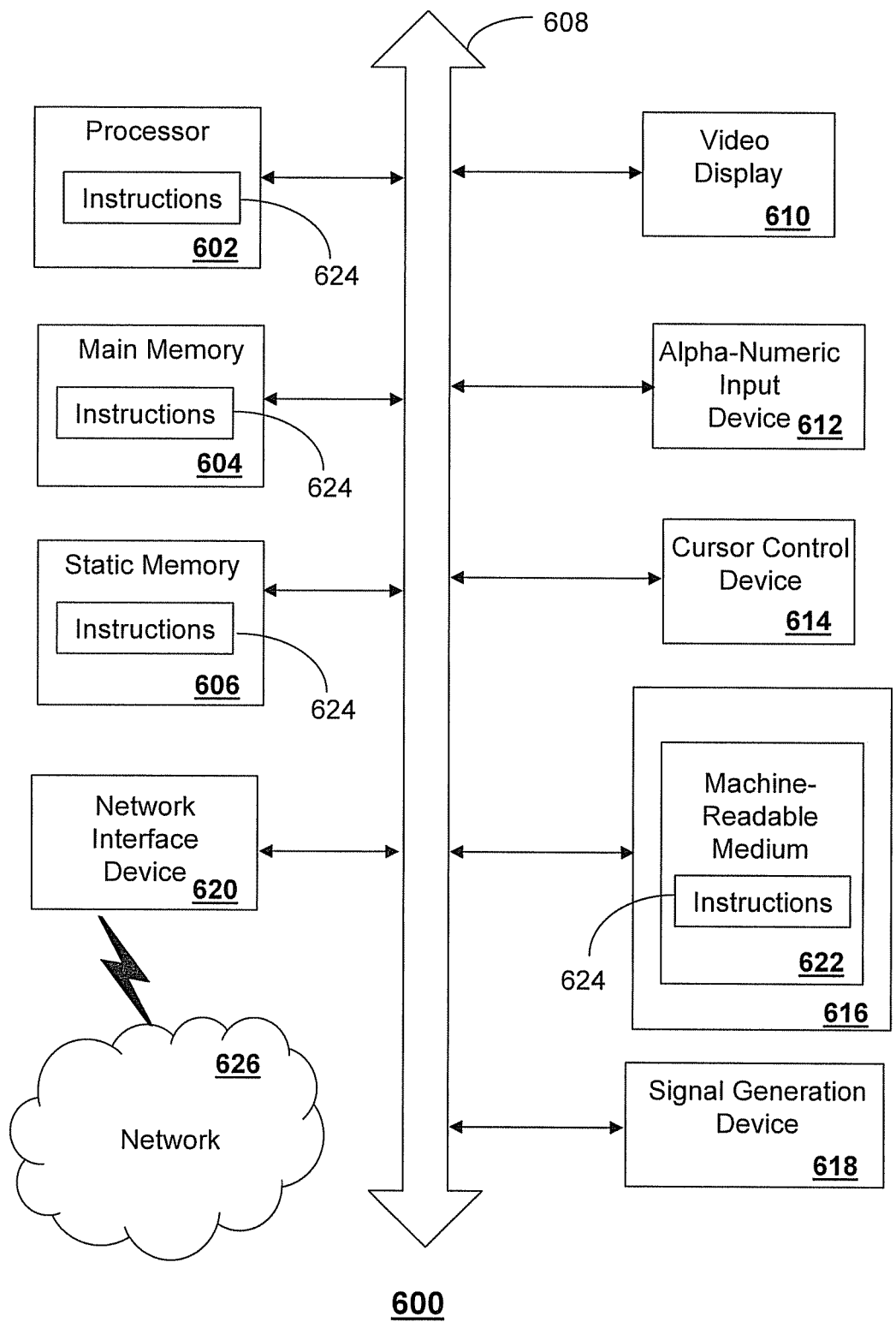
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Figure 7:
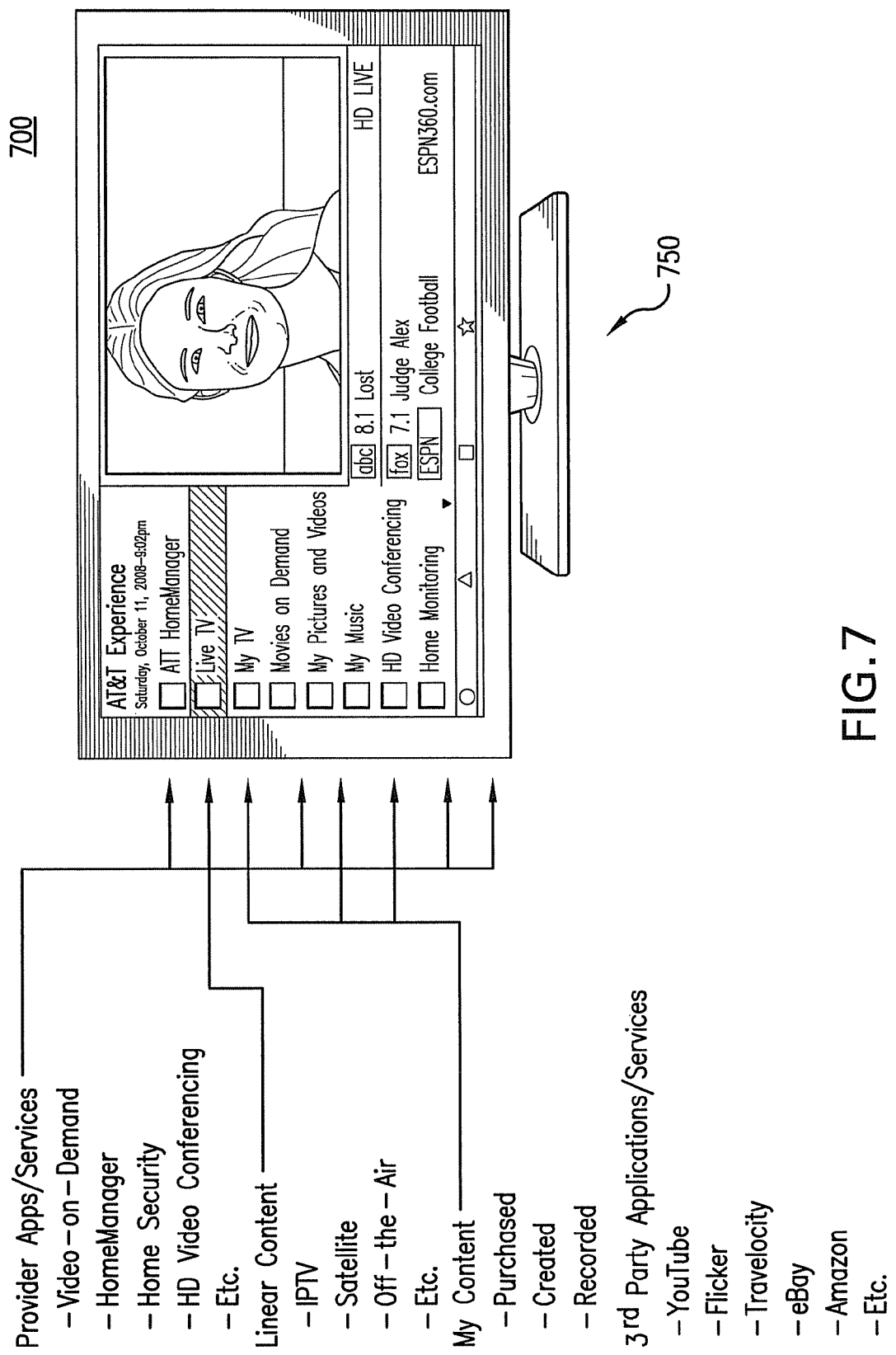
FIG. 7 depicts an illustrative embodiment of a user interface that can be utilized by each of the media devices of FIGS. 1 and 3.

FIG. 7 depicts a graphical user interface 750 that can be used with one or more of the exemplary systems and/or methods described herein. The GUI 750 can be displayed on any of the premises media devices that are in communication with a service gateway, such as MAG 105.

In one embodiment, GUI 750 can be utilized to access a Home Security Application executing on a Service Gateway (such as MAG 105) in the home or other premises. The application can include professional monitoring such as for intrusion, fire and carbon monoxide. The application can also include remote video monitoring, such as remote alerts, SMS and email.

Figure 8:
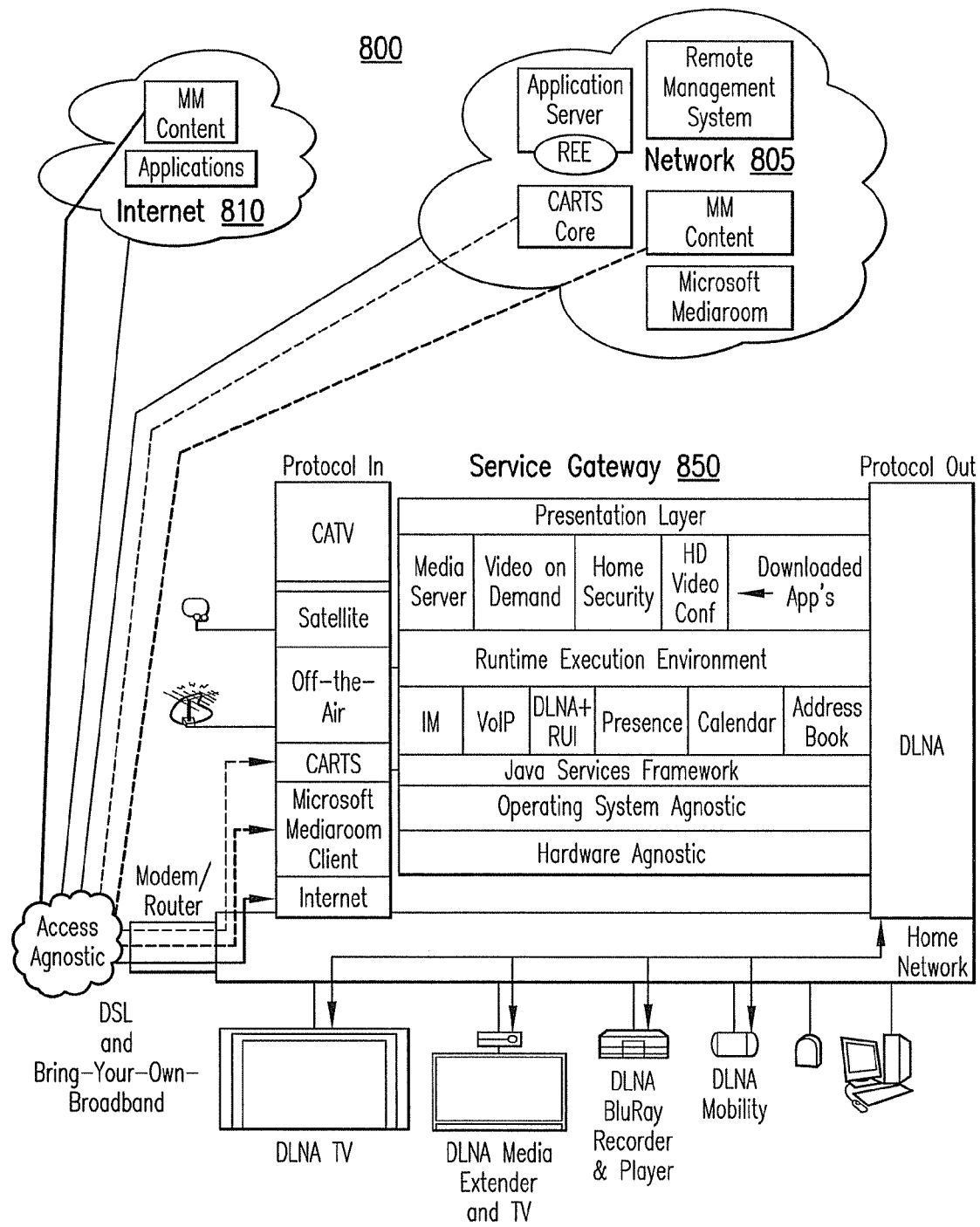
FIG. 8 depicts an illustrative embodiment of a communication system that provides media services.

FIG. 8 depicts a communication system 800 that can provide for a common format and/or common user interface in a home or other premises. The system can include a service gateway 850 that is in communication with one or both of a service provider network 805 and the Internet 810. The service gateway 850 can provide for a common user experience across wired and wireless services and devices. The service gateway 850 can be in communication with an integrated premises or home network that includes seamless wireless/wireline integration, broadband coverage throughout the home, and plug-and-play for devices and services. Service gateway 850 can receive media content of various communication protocols and convert the media content to a common format, such as DLNA. The system 800 can include a range of services with options such as: multiple options for video services (IPTV, Satellite, Internet, etc.), Internet content on the TV, home applications (Home Security, Home Automation & Control, etc.), access to and sharing of multimedia content (photographs, music, video, etc.) and so forth.

In one embodiment, the service gateway 850 can utilize DLNA technology to enable multimedia content sharing (photographs, music, video, etc.) among devices, such as TVs, STBs, camcorders, digital cameras, Blu-ray Players and media servers. The service gateway 850 can provide for conversion of proprietary protocols to DLNA standard protocols, multiple options for video services (linear and Over-the-Top), DLNA Media Server, and/or local execution of applications, such as: HD Video Conferencing, Home Security and Home Automation & Control The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein; it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage device comprising instructions which, responsive to being executed by a processor, cause the processor to perform operations comprising:

detecting a group of media devices of a premises that are capable of presenting media content and are compatible with a media gateway for receiving a portion of the media content from the media gateway over a power line of the premises;

determining a common user interface to be presented by the group of media devices;

detecting first user interaction with the common user interface from a first media device of the group of media devices;

transmitting first display signals to the group of media devices for displaying the first user interaction on the common user interface using a first icon visually representative of the first media device, wherein the first display signals provide a visual indication identifying the first user interaction;

detecting second user interaction with the common user interface from a second media device of the group of media devices;

transmitting second display signals to the group of media devices for displaying the second user interaction on the common user interface using a second icon visually representative of the second media device, wherein the second display signals provide a visual indication identifying the second user interaction;

monitoring a current passing through the power line;

evaluating noise due to the current, based on the monitoring of the current;

adjusting a mode of communication from transmitting the media content over the power line to wirelessly transmitting the media content responsive to the evaluating of the noise; and prioritizing the first user interaction and the second user interaction when the first user interaction and the second user interaction represent contradictory control signals, wherein the premises comprise a building with the group of media devices and the media gateway located therein, wherein each of the media devices of the group of media devices and the media gateway are located separately from each other, and wherein the power line is connected to each of the media devices of the group of media devices and the media gateway.

2. The non-transitory machine-readable storage device of claim 1, wherein the first and second user interactions are simultaneous, and wherein the first and second user interactions are displayed on the common user interface simultaneously.

3. The non-transitory machine-readable storage device of claim 1, wherein the prioritizing further comprises prioritizing the first and second user interactions based on a type of media device.

4. The non-transitory machine-readable storage device of claim 1, wherein the operations further comprise transmitting the first and second display signals over the power line of the premises, wherein the detection of the group of media devices is based on receiving a detection signal transmitted by a subset of the group of media devices upon a power up of the subset of the group of media devices.

5. The non-transitory machine-readable storage device of claim 1, wherein the first and second display signals are transmitted wirelessly without being transmitted over the power line.

6. The non-transitory machine-readable storage device of claim 1, wherein the operations further comprise transmitting the portion of the media content from the media gateway to the first media device over the power line in response to the detected first user interaction.

7. The non-transitory machine-readable storage device of claim 1, wherein the operations further comprise wirelessly transmitting control signals while the media content is transmitted via the power line.

8. The non-transitory machine-readable storage device of claim 7, wherein the control signals are associated with the common user interface.

9. A server comprising:
a memory storing executable instructions; and
a controller coupled with the memory, wherein the controller, responsive to executing the instructions, performs operations comprising:
determining a common user interface to be presented by a group of media devices of a premises, the group of media devices being capable of receiving media content over a power line of the premises and being capable of presenting the media content;
detecting user interaction with the common user interface from different media devices of the group of media devices;
transmitting display signals to the group of media devices for displaying the user interaction on the common user interface, the display signals differentiating the different media devices that received the user interaction, the display signals providing a visual indication identifying the user interaction;
monitoring a current passing through the power line;
evaluating noise due to the current, based on the monitoring of the current; and
prioritizing a first user interaction and a second user interaction when the first user interaction and the second user interaction represent contradictory control signals,
wherein the premises comprise a building with the group of media devices located therein,
wherein each of the media devices of the group of media devices are located separately from each other, and
wherein the power line is connected to each of the media devices of the group of media devices.

10. The server of claim 9, wherein the operations further comprise:
retrieving the media content in response to a first portion of the user interaction; and
transmitting the media content to a target device of the group of media devices in response to a second portion of the user interaction.

11. The server of claim 9, wherein the operations further comprise transmitting a portion of the media content wirelessly to a target device of the group of media devices without transmitting the portion over the power line in response to the evaluating of the noise due to the current passing through the power line of the premises.

12. The server of claim 9, wherein the operations further comprise:
accessing stored user preferences associated with the group of media devices;
obtaining the media content; and
adjusting a format of the media content based on the stored user preferences.

13. The server of claim 9, wherein the operations further comprise selectively transmitting the display signals and the media content over the power line based on determined parameters of the power line.

14. The server of claim 9, wherein the display signals differentiate the different media devices using different icons that are visually representative of each of the different media devices.

15. The server of claim 9, wherein the prioritizing further comprises prioritizing the first user interaction and the second user interactions based on a type of media device.

16. A media device comprising:
a memory storing executable-instructions; and
a controller coupled with the memory, wherein the controller, responsive to executing the instructions, performs operations comprising:
presenting a common user interface, the media device being one of a group of media devices of a premises that presents the common user interface, the group of media devices being capable of receiving media content from a media gateway and being capable of presenting the media content;
detecting user interaction with the common user interface;
transmitting interaction signals representative of the detected user interaction to the media gateway;
receiving display signals from the media gateway, the display signals comprising the user interaction, the display signals differentiating different media devices of the group of media devices that received the user interaction, the display signals providing a visual indication identifying the user interaction;
receiving a portion of the media content over a power line of the premises;
monitoring a current passing through the power line;
evaluating noise due to the current, based on the monitoring of the current; and
prioritizing, a first user interaction and a second user interaction when the first user interaction and the second user interaction represent contradictory control signals,
wherein the premises comprise a building with the group of media devices and the media gateway located therein,
wherein each of the media devices of the group of media devices and the media gateway are located separately from each other, and
wherein the power line is connected to each of the media devices of the group of media devices and the media gateway.

17. The media device of claim 16, wherein the operations further comprise receiving a first portion of the media content over the power line and a second portion of the media content via wireless communication, wherein a switch between utilizing the power line and utilizing the wireless communication is based on detecting the noise in the power line due to the current passing through the power line.

18. The media device of claim 17, wherein the operations further comprise wirelessly receiving the display signals and the media content.

19. A server comprising:
a memory storing executable instructions; and
a controller coupled with the memory, wherein the controller, responsive to executing the instructions, performs operations comprising:
detecting a group of media devices of a premises that are capable of receiving media content from the server over a power line of the premises and are capable of presenting the media content;
receiving media content in a plurality of formats from a media source;
adjusting the plurality of formats into a common format presentable by each of the group of media devices;
transmitting display signals to each of the group of media devices for displaying a common user interface, the display signals providing a visual indication identifying user interaction at one of the group of media devices;
monitoring a current passing through the power line;
evaluating noise due to the current, based on the monitoring of the current; and prioritizing a first user signal and a second user signal received via the common user interface when the first user signal and the second user signal comprise contradictory control signals, wherein the premises comprise a building with the group of media devices located therein, wherein each of the media devices of the group of media devices are located separately from each other, and wherein the power line is connected to each of the media devices of the group of media devices.

20. The server of claim 19, wherein the operations further comprise:

obtaining parameters associated with the power line;

selecting a mode of communication from one of the power line and a wireless communication link for transmitting the media content to a target device of the group of media devices based on the obtained parameters; and transmitting the media content based on the selected mode.

21. A method, comprising:

determining, by a device comprising a processor, a common user interface to be presented by a group of media devices of a premises, the group of media devices being capable of receiving media content from a media gateway and being capable of presenting the media content;

detecting, by the device, user interaction with the common user interface from different media devices of the group of media devices;

transmitting, by the device, the media content from the media gateway to a target device of the media devices over a power line of the premises;

transmitting, by the device, display signals from the processor to the group of media devices for displaying the user interaction on the common user interface, the display signals differentiating the different media devices that received the user interaction, the display signals providing a visual indication identifying the user interaction;

monitoring, by the device, a current passing through the power line;

evaluating, by the device, noise due to the current; based on the monitoring of the current; and prioritizing a first user interaction and a second user interaction when the first user interaction and the second user interaction represent contradictory control signals, wherein the premises comprise a building with the group of media devices and the media gateway located therein, wherein each of the media devices of the group of media devices and the media gateway are located separately from each other, and wherein the power line is connected to each of the media devices of the group of media devices and the media gateway.

22. The method of claim 21, comprising transmitting control signals associated with the common user interface wirelessly while the media content is transmitted via the power line.

23. The method of claim 21, wherein the prioritizing further comprises prioritizing the first user interaction and the second user interactions based on a type of media device.

24. The method of claim 21, further comprising wirelessly transmitting the display signals.

25. The method of claim 21, wherein the display signals differentiate the different media devices that received the user interaction using different icons representative of a type of the media devices.

* * * * *